US012136375B2

(12) United States Patent
Kim et al.

(10) Patent No.: US 12,136,375 B2

(45) Date of Patent: Nov. 5, 2024

(54) DISPLAY DEVICE

(71) Applicant: Samsung Display Co., Ltd., Yongin-Si (KR)

(72) Inventors: Jiyoun Kim, Pohang-si (KR); Sehyuk Park, Seongnam-si (KR); Hongsoo Kim, Hwaseong-si (KR); Jaekeun Lim, Suwon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 20 days.

(21) Appl. No.: 17/582,805

(22) Filed: Jan. 24, 2022

(65) Prior Publication Data

US 2022/0301479 A1 Sep. 22, 2022

(30) Foreign Application Priority Data

Mar. 18, 2021 (KR) ........................ 10-2021-0035053

(51) Int. Cl.

*G09G 5/06* (2006.01)

*G09G 3/20* (2006.01)

(52) U.S. Cl.

CPC ............. *G09G 3/2003* (2013.01); *G09G 5/06* (2013.01); *G09G 2300/0452* (2013.01); *G09G 2310/0267* (2013.01); *G09G 2310/0275* (2013.01)

(58) Field of Classification Search

CPC ................... G09G 3/2003; G09G 5/06; G09G 2300/0452; G09G 2310/0267

See application file for complete search history.

(56) References Cited

U.S. PATENT DOCUMENTS

| | | | | |
|---|---|---|---|---|
| 2012/0026204 A1* | 2/2012 | Chun | G09G 3/003 | 345/690 |
| 2014/0152634 A1* | 6/2014 | Shibata | G09G 3/3614 | 345/96 |
| 2015/0170607 A1* | 6/2015 | Shin | G09G 3/3406 | 345/690 |
| 2018/0336840 A1* | 11/2018 | Niikura | C09K 19/02 | |
| 2019/0080652 A1* | 3/2019 | Kim | G09G 3/3291 | |

FOREIGN PATENT DOCUMENTS

| | | |
|---|---|---|
| KR | 10-2019-0136396 A | 12/2019 |
| KR | 10-2021-0104283 A | 8/2021 |

* cited by examiner

*Primary Examiner* — Robert J Michaud

(74) *Attorney, Agent, or Firm* — Innovation Counsel LLP

(57) ABSTRACT

A driving controller of a display device controls a scan driving circuit to sequentially drive a first group of scan lines among a plurality of scan lines to an active level during a first low-frequency frame when the operation mode is a low frequency mode and to sequentially drive a second group of scan lines among the plurality of scan lines to the active level during a second low-frequency frame, outputs an image data signal according to a first arrangement order of a plurality of color pixels in a first row during the first low-frequency frame, and outputs the image data signal according to a second arrangement order of the plurality of color pixels in a second row during the second low-frequency frame.

18 Claims, 17 Drawing Sheets

FIG. 9

240

| | 60Hz | 30Hz | 20Hz | 15Hz | 10Hz | 5Hz |
|---|---|---|---|---|---|---|
| S1 | R1 | R1 | R1 | R1 | R1 | R1 |
| S2 | R2 | | | | | |
| S3 | R3 | B3 | | | | |
| S4 | R4 | | B4 | | | |
| S5 | R5 | R5 | | B5 | | |
| S6 | R6 | | | | | |
| S7 | R7 | B7 | R7 | | B7 | |
| S8 | R8 | | | | | |
| S9 | R9 | R9 | | R9 | | |
| S10 | R10 | | B10 | | | |
| S11 | R11 | B11 | | | | |
| S12 | R12 | | | | | |
| S13 | R13 | R13 | R13 | B13 | R13 | B13 |
| S14 | R14 | | | | | |
| S15 | R15 | B15 | | | | |
| S16 | R16 | | B16 | | | |
| S17 | R17 | R17 | | R17 | | |
| S18 | R18 | | | | | |
| S19 | R19 | B19 | R19 | | B19 | |
| S20 | R20 | | | | | |
| S21 | R21 | R21 | | B21 | | |
| S22 | R22 | | B22 | | | |
| S23 | R23 | B23 | | | | |
| S24 | R24 | | | | | |
| S25 | R25 | R25 | R25 | R25 | R25 | R25 |
| ⋮ | ⋮ | ⋮ | ⋮ | ⋮ | ⋮ | ⋮ |

Color Signal Swap

DISPLAY DEVICE

CROSS-REFERENCE TO RELATED APPLICATIONS

This U.S. non-provisional patent application claims priority under 35 U.S.C. § 119 of Korean Patent Application No. 10-2021-0035053, filed on Mar. 18, 2021, the disclosure of which is hereby incorporated by reference in its entirety.

BACKGROUND

The present disclosure herein relates to a display device.

In general, a display device includes a display panel for displaying an image and a driving circuit for driving the display panel. The display panel includes a plurality of scan lines, a plurality of data lines, and a plurality of pixels. The driving circuit includes a data driving circuit for outputting data signals to the data lines, a scan driving circuit for outputting scan signals for driving the scan lines, and a driving controller for controlling the data driving circuit and the scan driving circuit.

The display device may display an image by outputting a scan signal to a scan line connected to a pixel and providing a data voltage corresponding to an image data to a data line connected to the pixel.

SUMMARY

The present disclosure provides a display device with reduced power consumption. The display device may provide an alternative scan driving (ASD) for driving a display panel that has a pentile structure.

According to an embodiment of the inventive concept, a display device includes: a display panel including a plurality of pixels respectively connected to one of a plurality of data lines and at least one of a plurality of scan lines; a data driving circuit configured to drive the plurality of data lines; a scan driving circuit configured to drive the plurality of scan lines; and a driving controller configured to receive an image signal and a control signal, determine an operation mode based on the image signal, generate an image data signal based on the image signal, and provide the image data signal to the data driving circuit, wherein the plurality of pixels include a plurality of color pixels sequentially arranged in a first direction, wherein the plurality of color pixels in a first row are arranged in a first arrangement order, wherein the plurality of color pixels in a second row are arranged in a second arrangement order, wherein the driving controller is further configured to: control the scan driving circuit based on the operation mode being a low frequency mode to sequentially drive a first group of scan lines among the plurality of scan lines to an active level during a first low-frequency frame and sequentially drive a second group of scan lines among the plurality of scan lines to the active level during a second low-frequency frame, and output the image data signal according to the first arrangement order of the plurality of color pixels in the first row during the first low-frequency frame and output the image data signal according to the second arrangement order of the plurality of color pixels in the second row during the second low-frequency frame.

In an embodiment, the plurality of color pixels sequentially arranged in the first direction may include four color pixels, and wherein, in the first row, the first arrangement order of the four color pixels is a first color pixel, a second color pixel, a third color pixel, and the second color pixel.

In an embodiment, the image data signal provided to the four color pixels in the first row during the first low-frequency frame may include a first color signal corresponding to the first color pixel, a second color signal corresponding to the second color pixel, a third color signal corresponding to a third color pixel, and the second color signal corresponding to the second color pixel.

In an embodiment, the plurality of color pixels sequentially arranged in the first direction may include four color pixels, and wherein, in the second row, the second arrangement order of the four color pixels is a third color pixel, a second color pixel, a first color pixel, and the second color pixel.

In an embodiment, the image data signal provided to the four pixels in the second row during the second low-frequency frame may include a third color signal corresponding to the third color pixel, a second color signal corresponding to the second color pixel, a first color signal corresponding to the first color pixel, and the second color signal corresponding to the second color pixel.

In an embodiment, the driving controller may include: an image processor configured to receive the image signal and the control signal, and output a mode signal and the image data signal; and a control signal generation part configured to receive the image signal and the control signal and output a first control signal and a second control signal in response to the mode signal, wherein the data driving circuit may receive the first control signal, and the scan driving circuit receives the second control signal.

In an embodiment, the image processor may include: a mode determination part configured to output the mode signal and a first image signal based on the image signal; an image conversion part configured to convert the first image signal into a second image signal; and an output part configured to convert the second image signal into the image data signal and output the image data signal in response to the mode signal.

In an embodiment, the first image signal may include a first color signal, a second color signal, and a third color signal, wherein the second image signal corresponding to the first row may include the first color signal, the second color signal, the third color signal, and the second color signal, and wherein the second image signal corresponding to the second row may include the third color signal, the second color signal, the first color signal, and the second color signal.

In an embodiment, the display device may further include a lookup table for storing swap information for the first color signal, the second color signal, and the third color signal in the second image signal, wherein the output part may convert the second image signal into the image data signal based on the swap information in the low frequency mode.

In an embodiment, the lookup table may store the swap information for the first color signal, the second color signal, and the third color signal in the second image signal corresponding to a plurality of driving frequencies of the low frequency mode.

In an embodiment, the driving controller may determine that the operation mode is the low frequency mode based on the image signal being a still image signal.

In an embodiment, the driving controller may determine that the operation mode is a normal mode based on the image signal being a video image signal.

In an embodiment, the driving controller may control the scan driving circuit to sequentially drive the plurality of scan lines to an active level in each frame in the normal mode.

In an embodiment, a driving frequency of the low frequency mode may be lower than a driving frequency of the normal mode.

According to an embodiment of the inventive concept, a display device includes: a display panel including a plurality of pixels respectively connected to at least one of a plurality of data lines and at least one of a plurality of scan lines; a data driving circuit configured to drive the plurality of data lines; a scan driving circuit configured to drive the plurality of scan lines; and a driving controller configured to receive an image signal and a control signal, generate an image data signal based on the image signal, and output a mode signal corresponding to the image signal and the image data signal, wherein the plurality of pixels include a plurality of color pixels sequentially arranged in a first direction, wherein the plurality of color pixels in a first row are arranged in a first arrangement order, wherein the plurality of color pixels in a second row are arranged in a second arrangement order, wherein the driving controller controls the scan driving circuit based on the mode signal indicating a low frequency mode to sequentially drive a first group of scan lines among the plurality of scan lines to an active level during a first low-frequency frame and sequentially drive a second group of scan lines among the plurality of scan lines to the active level during a second low-frequency frame, wherein the data driving circuit outputs a data signal according to the first arrangement order of the plurality of color pixels in the first row to the plurality of data lines during the first low-frequency frame, and outputs the data signal according to the second arrangement order of the plurality of color pixels in the second row to the plurality of data lines during the second low-frequency frame.

In an embodiment, the plurality of color pixels sequentially arranged in the first direction may include four color pixels, and wherein, in the first row, the first arrangement order of the four color pixels is a first color pixel, a second color pixel, a third color pixel, and the second color pixel.

In an embodiment, the data signal provided to the four color pixels in the first row during the first low-frequency frame may include a first color signal corresponding to the first color pixel, a second color signal corresponding to the second color pixel, a third color signal corresponding to a third color pixel, and the second color signal corresponding to the second color pixel.

In an embodiment, the plurality of color pixels sequentially arranged in the first direction may include four color pixels, and wherein, in the second row, the second arrangement order of the four color pixels is a third color pixel, a second color pixel, a first color pixel, and the second color pixel.

In an embodiment, the data signal provided to the four pixels in the second row during the second low-frequency frame may include a third color signal corresponding to the third color pixel, a second color signal corresponding to the second color pixel, a first color signal corresponding to the first color pixel, and the second color signal corresponding to the second color pixel.

In an embodiment, the data driving circuit may include: a lookup table configured to store swap information for color signals of the image data signal; a data conversion part configured to convert the image data signal into a first image data signal based on the image data signal and the swap information; and a data driving part configured to receive the first image data signal and provide a plurality of data signals to the plurality of data lines.

BRIEF DESCRIPTION OF THE FIGURES

The accompanying drawings are included to provide a further understanding of the inventive concept, and are incorporated in and constitute a part of the present disclosure. The drawings illustrate embodiments of the inventive concept and, together with the description, serve to explain principles of the inventive concept. In the drawings:

FIG. 9 is a diagram illustrating swap information stored in a lookup table according to an embodiment of the inventive concept;

DETAILED DESCRIPTION

Figure 1:
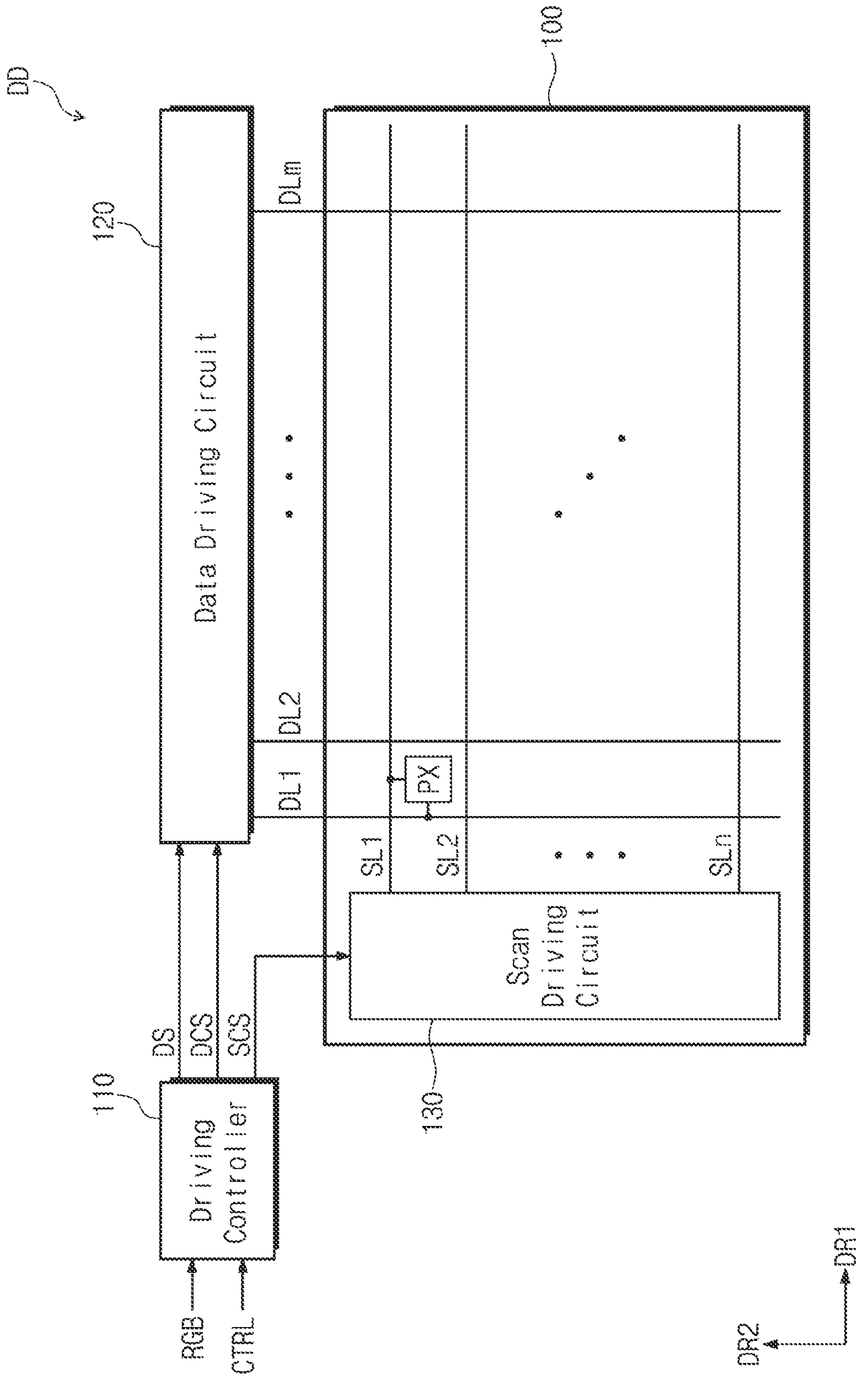
FIG. 1 is a perspective view of a display device according to an embodiment of the inventive concept.

In the present disclosure, when an element (or region, layer, part, etc.) is referred to as being "on," "connected to," or "coupled to" another element, it means that the element may be directly placed on/connected to /coupled to another components, or a third component may be arranged between them.

Like reference numerals refer to like elements. Additionally, in the drawings, the thicknesses, proportions, and dimensions of components may be exaggerated for effective description. "And/or" includes all or any of one or more combinations defined by listed components.

It will be understood that the terms "first," "second," etc. are used herein to describe various components, but these components should not be limited by these terms. The above terms are used only to distinguish one component from another. For example, a first component may be referred to as a second component and vice versa without departing from the scope of the inventive concept. The terms of a singular form may include a plural form unless otherwise explicitly specified.

In addition, terms such as "below," "a lower side," "on," "an upper side," etc. are used to describe a relationship of configurations shown in the drawing. The terms are described as a relative concept based on a direction shown in the drawing, but the inventive concept is not limited thereto.

In various embodiments of the inventive concept, the term "include," "comprise," "including," or "comprising," specifies a property, a region, a fixed number, a step, a process, an element, and/or a component but does not exclude other properties, regions, fixed numbers, steps, processes, elements, and/or components.

Unless otherwise explicitly defined, terms (including technical and scientific terms) used herein have the same meaning as commonly understood by one of ordinary skill in the art to which this inventive concept belongs. In addition, terms defined in a commonly used dictionary should be interpreted as having a meaning consistent with the meaning in the context of the related technology, and unless interpreted in an ideal or overly formal sense, the terms are explicitly defined herein.

Hereinafter, various embodiments of the inventive concept will be described with reference to the drawings.

FIG. 1 is a perspective view of a display device according to an embodiment of the inventive concept.

Referring to FIG. 1, a display device DD includes a display panel 100, a driving controller 110, and a data driving circuit 120.

The display panel 100 includes a scan driving circuit 130, a plurality of pixels PX, a plurality of data lines DL1 to DLm, and a plurality of scan lines SL1 to SLn. Each of the plurality of pixels PX is connected to a corresponding one of the plurality of data lines DL1 to DLm and a corresponding one of the plurality of scan lines SL1 to SLn.

Each of the plurality of scan lines SL1 to SLn extends in a first direction DR1 and is disposed to be spaced apart from each other in a second direction DR2 that crosses the first direction DR1. Each of the plurality of data lines DL1 to DLm extends in the second direction DR2 and is disposed to be spaced apart from each other in the first direction DR1.

The display panel 100 that displays an image may be a liquid crystal display (LCD) panel, an electrophoretic display panel, an organic light emitting diode (OLED) panel, a light emitting diode (LED) panel, an inorganic electro luminescent (EL) display panel, a field emission display (FED) panel, a surface-conduction electron-emitter display (SED) panel, a plasma display panel (PDP), and a cathode ray tube (CRT) display panel.

The driving controller 110 receives an image signal RGB and a control signal CTRL from an external device (not shown) for controlling the display of an image corresponding to the image signal RGB. For example, the control signal CTRL may include at least one synchronization signal and at least one clock signal. The driving controller 110 generates an image data signal DS by processing the image signal RGB according to an operating condition of the display panel 100 and provides the image data signal DS to the data driving circuit 120. The driving controller 110 generates a first control signal DCS and a second control signal SCS based on the control signal CTRL and provides the first control signal DC and the second control signal SCS to the data driving circuit 120 and the scan driving circuit 130, respectively. The first control signal DCS may include a horizontal synchronization start signal, a clock signal, and a line latch signal, and the second control signal SCS may include a vertical synchronization start signal and an output enable signal. In one embodiment, the first control signal DCS may include a mode signal (e.g., a mode signal MD in FIG. 2) indicating an operation mode of the display device DD. Examples of the operation mode of the display device DD include, but are not limited to, a normal mode and a low frequency mode, which will be discussed later in further detail.

The data driving circuit 120 may output grayscale voltages for driving the plurality of data lines DL1 to DLm in response to the first control signal DCS and the image data signal DS that are received from the driving controller 110. In an embodiment, the data driving circuit 120 may be implemented as an integrated circuit (IC) and may be directly mounted on a predetermined area of the display panel 100 or may be mounted on a separate printed circuit board (PCB) in a chip-on-film (COF) to be electrically connected to the display panel 100. In an embodiment, the data driving circuit 120 may be formed on the display panel 100 by the same process as pixel circuits of the pixels PX.

The scan driving circuit 130 drives the plurality of scan lines SL1 to SLn in response to the second control signal SCS that is received from the driving controller 110. In an embodiment, the scan driving circuit 130 may be formed on the display panel 100 by the same process as the pixel circuits of the pixels PX, but the inventive concept of the present disclosure is not limited thereto. For example, the scan driving circuit 130 may be implemented as an integrated circuit (IC) and may be directly mounted on a predetermined area of the display panel 100 or may be mounted on a separate printed circuit board in a chip-on-film (COF) to be electrically connected to the display panel 100.

In an embodiment, the scan driving circuit 130 may sequentially drive the scan lines SL1 to SLn during the normal mode of the display DD. In one embodiment, the scan driving circuit 130 may sequentially drive a first group of scan lines among the scan lines SL1 to SLn in the first frame of the low frequency mode, and sequentially drive a second group of scan lines among the scan lines SL1 to SLn in the second frame of the low frequency mode. The first frame and the second frame of the low frequency mode may appear alternately and repeatedly. The operation of the scanning driving circuit 130 in the low frequency mode will be described later in further detail.

Figure 2:
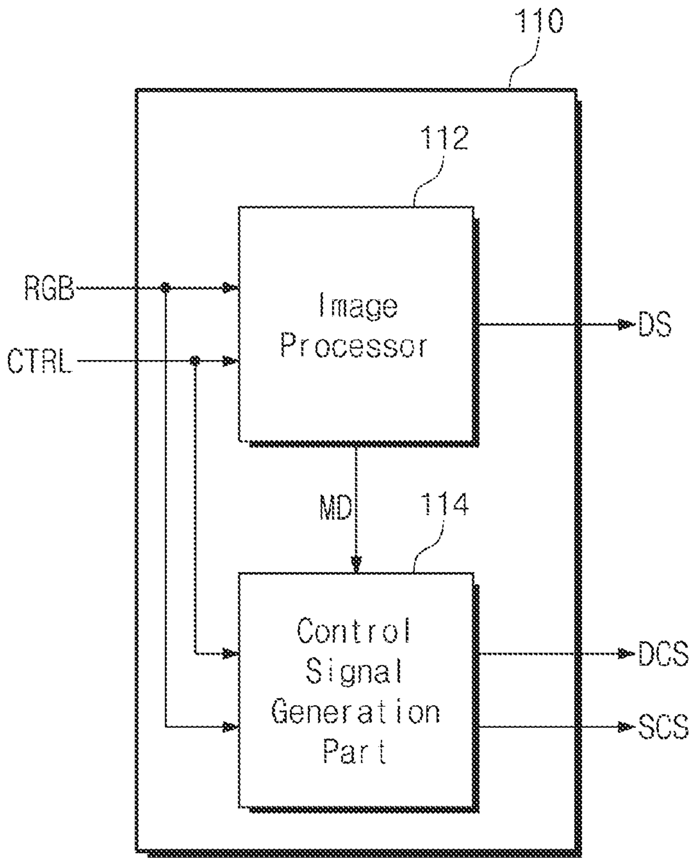
FIG. 2 is a block diagram of a driving controller of the display device illustrated in FIG. 1 according to an embodiment of the inventive concept.

FIG. 2 is a block diagram of the driving controller 110 of the display device DD illustrated in FIG. 1 according to an embodiment of the inventive concept.

As shown in FIG. 2, the driving controller 110 includes an image processor 112 and a control signal generation part 114.

The image processor 112 outputs the image data signal DS in response to the image signal RGB and the control signal CTRL. The image processor 112 may generate a mode signal MD in response to the image signal RGB and provide the mode signal MD to the control signal generation part 114.

The control signal generation part 114 generates the first control signal DCS and the second control signal SCS in response to the mode signal MD, the image signal RGB, and the control signal CTRL and outputs the first control signal DCS and the second control signal SCS to the data driving circuit 120 and the scan driving circuit 130, respectively.

Each of the first control signal DCS and the second control signal SCS may include information on an operation mode of the display device DD that is indicated by the mode signal MD.

Figure 3:
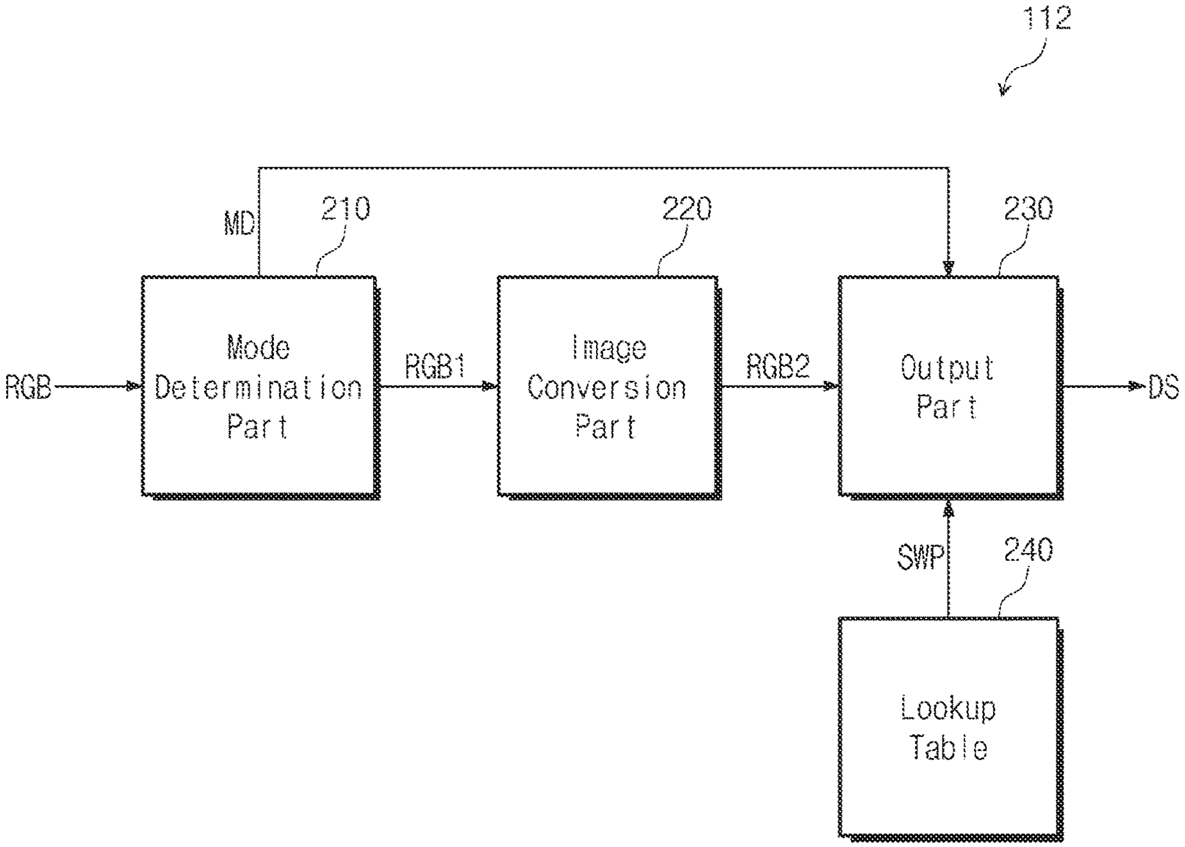
FIG. 3 is a block diagram of an image processor of the driving controller illustrated in FIG. 2 according to an embodiment of the inventive concept.

FIG. 3 is a block diagram of the image processor 112 of the driving controller illustrated in FIG. 2 according to an embodiment of the inventive concept.

Referring to FIG. 3, the image processor 112 includes a mode determination part 210, an image conversion part 220, an output part 230, and a lookup table 240.

The mode determination part 210 determines a type of the image signal RGB. In an embodiment, the mode determination part 210 may determine whether the image signal RGB is a video image signal that may change in each frame or a still image signal that may not change during multiple frames of a predetermined time. The mode determination part 210 may output the mode signal MD according to the determined type of the image signal RGB.

The image processor 112 may operate in either a normal mode or a low frequency mode according to the mode signal MD that is output from the mode determination part 210. For example, when the image signal RGB is determined to be a video image signal, the image processor 112 may operate in the normal mode. When the image signal RGB is determined to be a still image signal, the image processor 112 may operate in the low frequency mode. The operating frequency of the low frequency mode may be lower than that of the normal mode.

The mode determination part 210 converts the image signal RGB into a first image signal RGB1. During the normal mode, the first image signal RGB1 may be the same as the image signal RGB. During the low frequency mode, the mode determination part 210 may divide the image signal RGB into a plurality of groups, and outputs one of the plurality of groups as the first image signal RGB1 in each frame.

When the mode determination part 210 divides the image signal RGB into a plurality of groups, the number of groups may be determined according to a relationship between the driving frequency of the normal mode and the driving frequency of the low frequency mode.

For example, if the driving frequency of the normal mode is 60 Hz, and the driving frequency of the low frequency mode is 30 Hz, the mode determination part 210 divides the image signal RGB into two groups, that is, a first image signal group and a second image signal group, and alternately outputs the first image signal group and the second image signal group as the first image signal RGB1 in each frame. In an embodiment, the mode determination part 210 outputs the first image signal group as the first image signal RGB1 during a first frame, and outputs the second image signal group as the first image signal RGB1 during a second frame.

The image conversion part 220 may convert the first image signal RGB1 into a second image signal RGB2. In an embodiment, the first image signal RGB1 may include a first color signal, a second color signal, and a third color signal. The second image signal RGB2 may be a signal that is suitable for the pixels PX of the display panel 100 illustrated in FIG. 1. The operation of the image conversion part 220 will be described later in further detail with reference to FIG. 4. In an embodiment, the first color signal, the second color signal, and the third color signal may respectively correspond to a red color, a green color, and a blue color.

The output part 230 may convert the second image signal RGB2 received from the image conversion part 220 into the image data signal DS in response to the mode signal MD. In an embodiment, the output part 230 may convert the second image signal RGB2 into the image data signal DS based on a swap information SWP stored in the lookup table 240.

Figure 4:
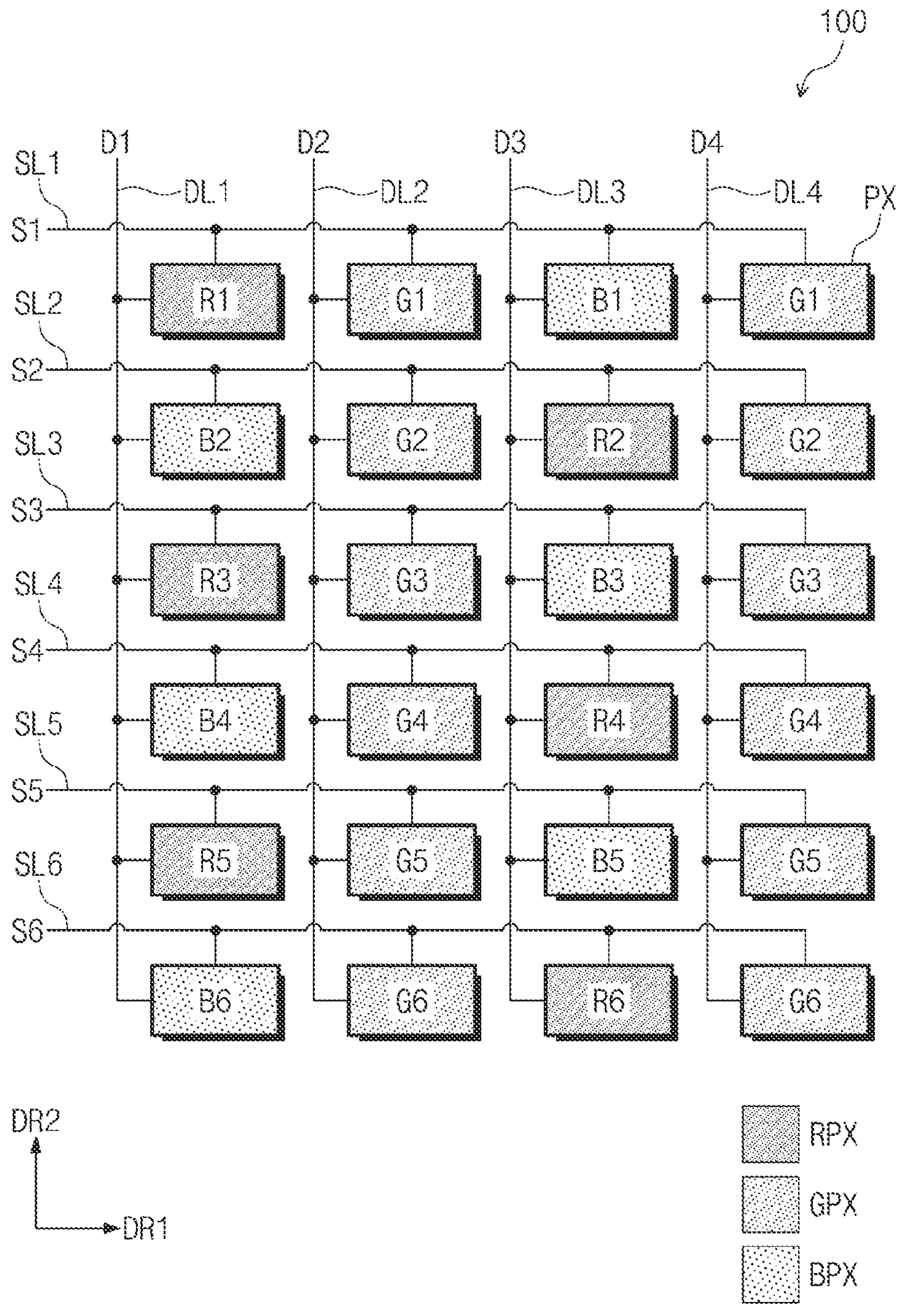
FIG. 4 illustrates a pixel arrangement of a display panel illustrated in FIG. 1 according to an embodiment of the inventive concept.

FIG. 4 illustrates a pixel arrangement of the display panel 100 illustrated in FIG. 1 according to an embodiment of the inventive concept.

Referring to FIG. 4, the pixels PX may be arranged in a matrix form in the first direction DR1 and the second direction DR2. Each of the pixels PX may correspond to one of a first color pixel RPX, a second color pixel GPX, and a third color pixel BPX. The first color pixel RPX may be a pixel emitting light of a red color, the second color pixel GPX may be a green pixel emitting light of a green color, and the third color pixel BPX may be a blue pixel emitting light of a blue color.

Four color pixels may be sequentially arranged in the first direction DR1 in each of the pixel rows of the display panel 100. Four color pixels of a first arrangement order may be arranged in each of the first rows of the display panel 100, for example, odd-numbered rows. Four color pixels of a second arrangement order may be arranged in each of the second rows, for example, even-numbered rows.

In the embodiment shown in FIG. 4, in each of the odd-numbered rows of the display panel 100 such as the first row, the third row, the fifth row, etc., the first color pixel RPX, the second color pixel GPX, the third color pixel BPX, and the second color pixels GPX are repeatedly arranged in the first direction DR1.

In each of the even-numbered rows of the display panel 100 such as the second row, the fourth row, the sixth row, etc., the third color pixel BPX, the second color pixel GPX, the first color pixel RPX, and the second color pixel GPX are repeatedly arranged in the first direction DR1.

The image conversion part 220 illustrated in FIG. 3 may convert a first image signal RGB1 that includes a first color signal, a second color signal, and a third color signal corresponding to odd-numbered rows into a second image signal RGB2 that includes a first color signal, a second color signal, a third color signal, and a second color signal. For example, the image conversion part 220 may convert a first image signal RGB1 that includes a first color signal, a second color signal, and a third color signal corresponding to the first row into a second image signal RGB2 that includes the first color signal, the second color signal, the third color signal, and the second color signal.

Similarly, the image conversion part 220 may convert a first image signal RGB1 that includes a first color signal, a second color signal, and a third color signal corresponding to even-numbered rows into a second image signal RGB2 that includes a third color signal, a second color signal, a first color signal, and a second color signal. For example, the image conversion part 220 may convert a first image signal RGB1 that includes a first color signal, a second color signal, and a third color signal corresponding to the second row into a second image signal RGB2 that includes a third color signal B2, a second color signal G2, a first color signal R2, and a second color signal G2.

The first image signal RGB1 including the first color signal, the second color signal, and the third color signal may be converted into a second image signal RGB2 that is rearranged in an order suitable for the pixel arrangement of the display panel 100 by the conversion operation of the image conversion part 220, and the output part 230 of the image processor 112 that is included in the driving controller 110 may provide the second image signal RGB2 as the image data signal DS to the data driving circuit 120 shown in FIG. 1. The data driving circuit 120 may provide the data signals D1 to Dm to the data lines DL1 to DLm, respectively. Therefore, an image suitable for the pixel arrangement of the display panel 100 may be displayed.

Figure 5:
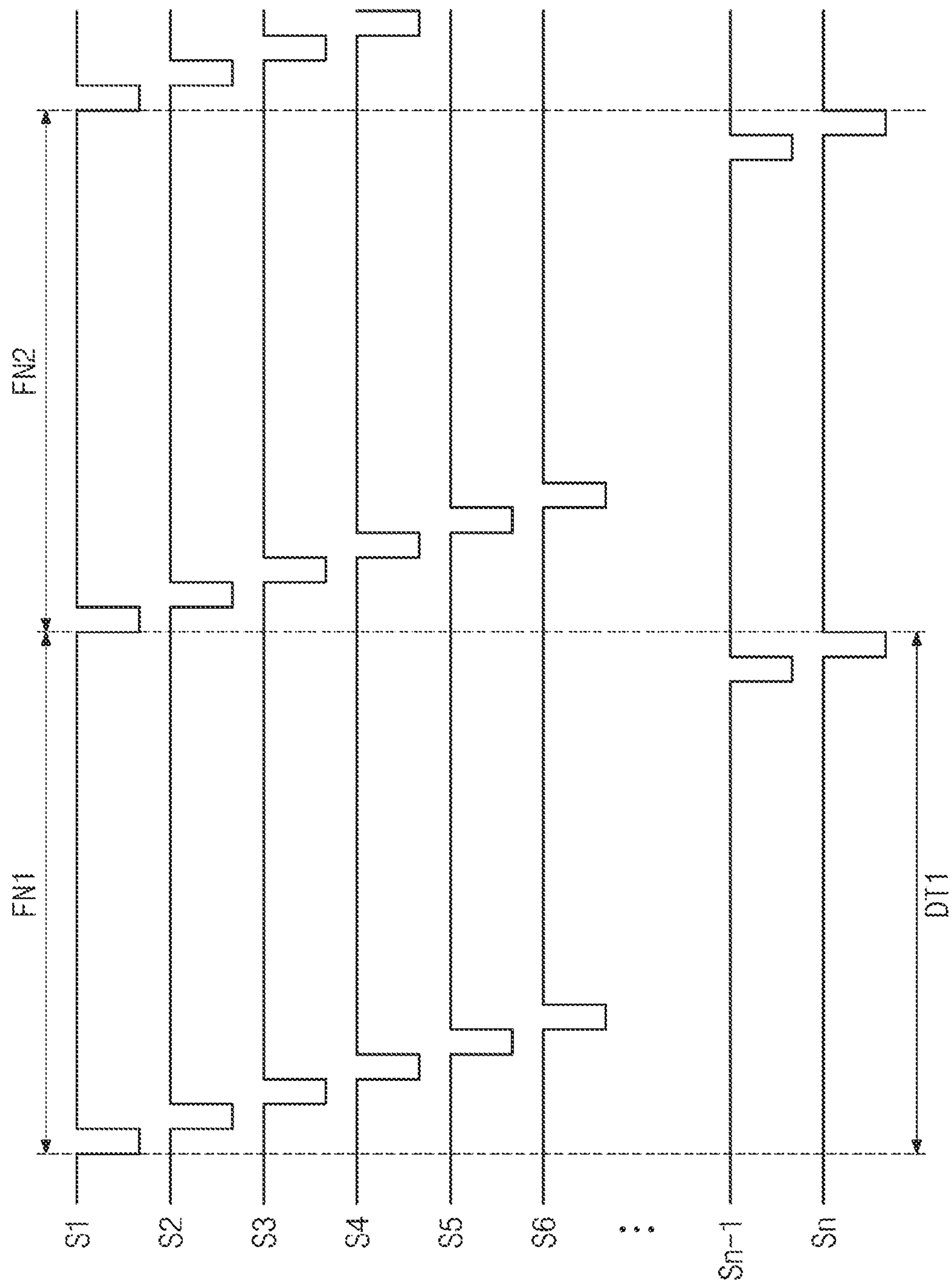
FIG. 5 is a timing diagram showing scan signals that are output from a scan driving circuit in a normal mode according to an embodiment of the inventive concept.

FIG. 5 is a timing diagram showing scan signals that are output from the scan driving circuit 130 in a normal mode according to an embodiment of the inventive concept.

Referring to FIGS. 1 and 5, the scan driving circuit 130 outputs scan signals S1 to Sn to the scan lines SL1 to SLn. During the normal mode, the scan signals S1 to Sn sequentially transition to an active level in each frame. In the example shown in FIG. 5, the scan signals S1 to Sn sequentially transition from a first normal frame FN1 and a second normal frame FN2 to a low level that corresponds to the active level. For example, the driving frequency of the normal mode may be 60 Hz, and a driving time DT1 of each of the first and second normal frames FN1 and FN2 in the normal mode that corresponds to a period of each of the scan signals S1 to Sn is 16.7 ms.

Figure 6:
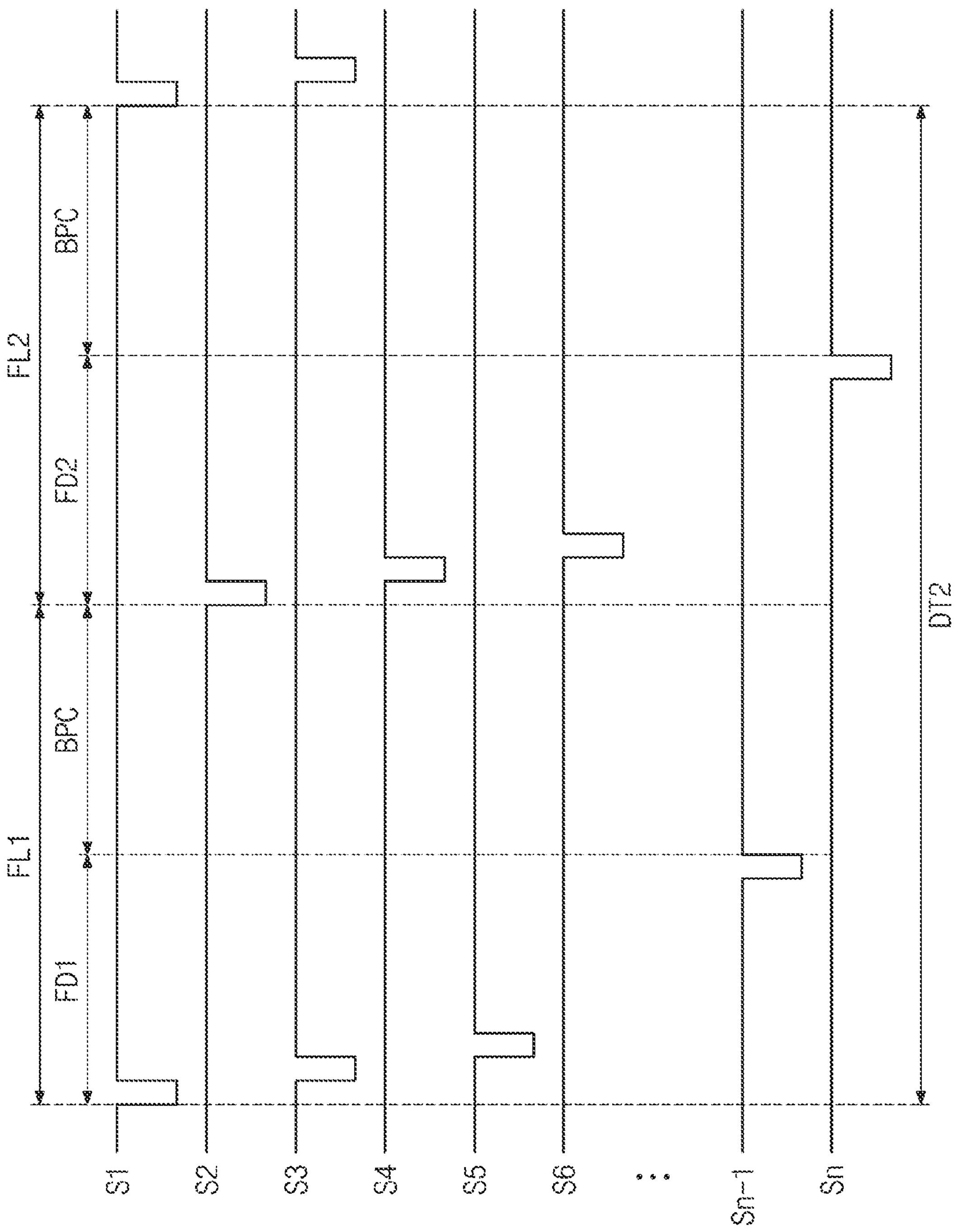
FIG. 6 is a timing diagram showing scan signals that are output from the scan driving circuit in a low frequency mode according to an embodiment of the inventive concept.

FIG. 6 is a timing diagram showing scan signals that are output from the scan driving circuit 130 in a low frequency mode according to an embodiment of the inventive concept.

Referring to FIGS. 1 and 6, the scan driving circuit 130 outputs the scan signals S1 to Sn to the scan lines SL1 to SLn. During a first low-frequency frame FL1 in the low frequency mode, the first group of the scan signals among the scan signals S1 to Sn that corresponds to the first rows (e.g., odd-numbered rows) of the pixels PX sequentially transition to the active level. During a second low-frequency frame FL2 in the low frequency mode, the second group of the scan signals among the scan signals S1 to Sn that corresponds to the second rows (e.g., even-numbered rows) of the pixels PX sequentially transition to the active level.

The first low-frequency frame FL1 may include a first low-frequency driving section FD1 and a blank section BPC. The second low-frequency frame FL2 may include a second low-frequency driving section FD2 and a blank section BPC.

In the example shown in FIG. 6, the scan signals S1, S3, S5, . . . , Sn-1 are included in the first group of the scan signals among the scan signals S1 to Sn, and the scan signals S2, S4, S6, . . . , Sn are included in the second group of the scan signals among the scan signals S1 to Sn. The first group of scan signals S1, S3, S5, . . . , Sn-1 sequentially transitions to a low level or an active level, during the first low-frequency driving section FD1. The second group of scan signals S2, S4, S6, . . . , Sn sequentially transitions to a low level or an active level, during the second low-frequency driving section FD2. During the low frequency mode, the scan driving circuit 130 alternately operates in the first low-frequency frame FL1 and the second low-frequency frame FL2.

For example, the driving frequency of the low frequency mode may be 30 Hz, and a driving time DT2 of the first and second low-frequency frames FL1 and FL2 in the low frequency mode that corresponds to a period of each of the scan signals S1 to Sn is 33.3 ms.

The first group of the scan signals S, S3, S5, . . . , Sn-1 and the second group of the scan signals S2, S4, S6, . . . , Sn shown in FIG. 6 are merely an example, and the inventive concept is not limited thereto.

Figure 7A:
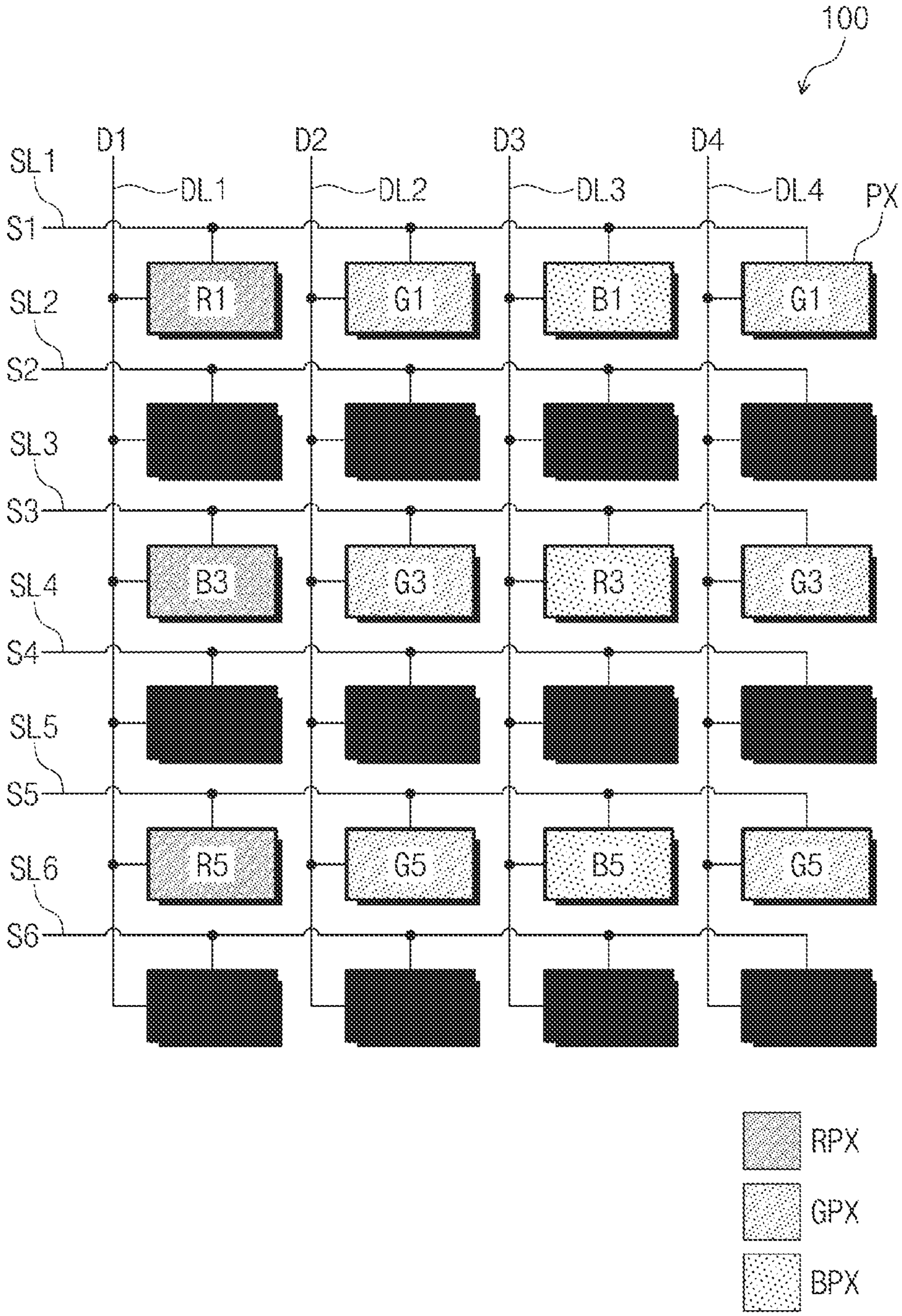
FIG. 7A illustrates an operation of the image processor in a first low-frequency frame of the low frequency mode according to an embodiment of the inventive concept.
Figure 8A:
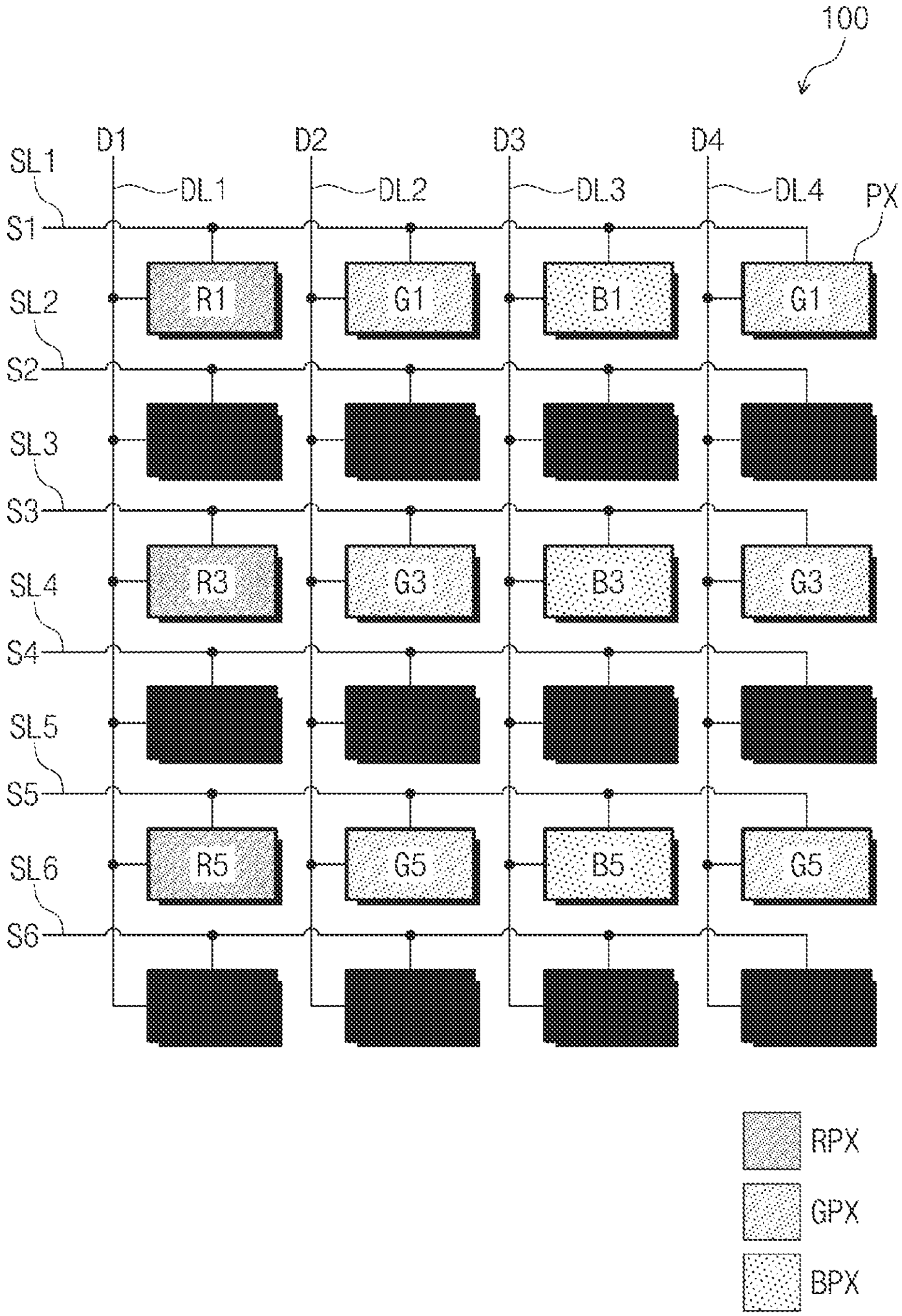
FIG. 8A illustrates an operation of the image processor in a first low-frequency frame of the low frequency mode according to another embodiment of the inventive concept.

FIGS. 7A and 8A illustrate the operation of the image processor 112 in the first low-frequency frame FL1 of the low frequency mode according to some embodiments of the inventive concept.

Referring to FIGS. 3 and 7A, when it is determined that the image signal RGB is a still image signal, the mode determination part 210 sets the operation mode to the low frequency mode and outputs the mode signal MD to the output part 230. Meanwhile, the mode determination part 210 alternately outputs the first image signal group and the second image signal group as the first image signal RGB1 in each frame of the low frequency mode.

For example, the mode determination part 210 outputs the first image signal group as the first image signal RGB1 in the first low-frequency frame FL1 of the low frequency mode. The first image signal group may include scan signals S1, S3, S5, . . . , Sn-1 to be provided to the pixels PX that are connected to the odd-numbered scan lines SL1, SL3, SL5, . . . , SLn-1.

As described with reference to FIGS. 4, 5, and 6, the first image signal RGB1 includes a first color signal, a second color signal, and a third color signal. The image conversion part 220 may convert the first image signal RGB1 corresponding to the odd-numbered rows into the second image signal RGB2 to include a first color signal, a second color signal, a third color signal, and a second color signal. Similarly, the image conversion part 220 may convert the first image signal RGB1 corresponding to the even-numbered rows into the second image signal RGB2 to include a third color signal, a second color signal, a first color signal, and a second color signal.

Since the image conversion part 220 operates regardless of the operation mode, the image conversion part 220 recognizes that the first image signal RGB1 corresponding to pixels, that is, the first color pixel RPX, the second color pixel GPX, the third color pixel BPX, and the second color pixel GPX, which are connected to the scan line SL3 of the display panel 100, corresponds to an even-numbered row, that is, a second row, and converts the first image signal RGB1 into a second image signal RGB2 including a third color signal B3, a second color signal G3, a first color signal R3, and a second color signal G3.

Therefore, a third color signal B3, a second color signal G3, a first color signal R3, and a second color signal G3 may be respectively provided to the first color pixel RPX, the second color pixel GPX, the third color pixel BPX, and the second color pixel GPX in the third row.

If the third color signal B3 is provided to the first color pixel RPX in the third row, or the first color signal R3 is provided to the third color pixel BPX in the third row, the display quality of the display panel 100 may be deteriorated.

Figure 7B:
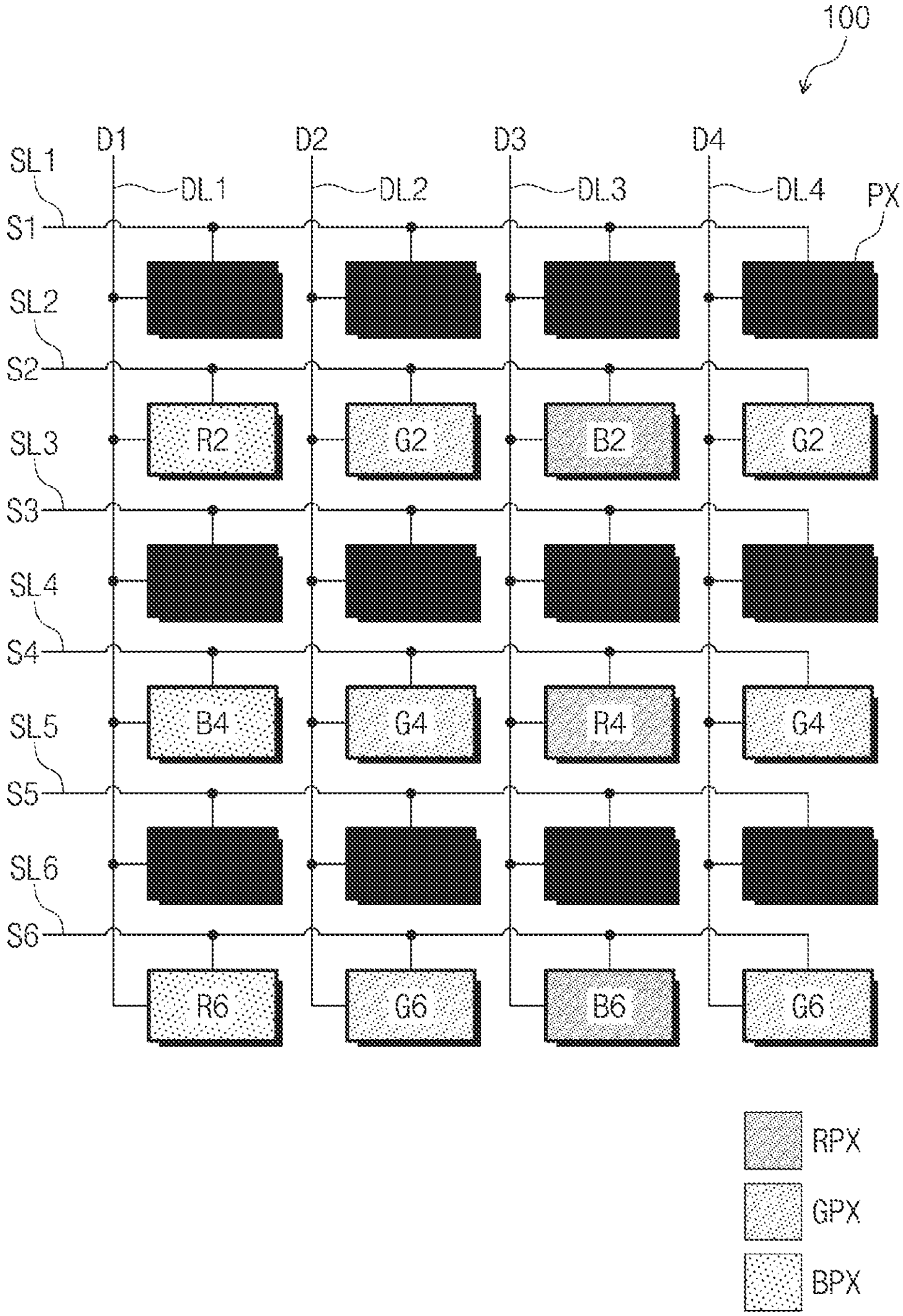
FIG. 7B illustrates an operation of the image processor in a second low-frequency frame of the low frequency mode according to an embodiment of the inventive concept.
Figure 8B:
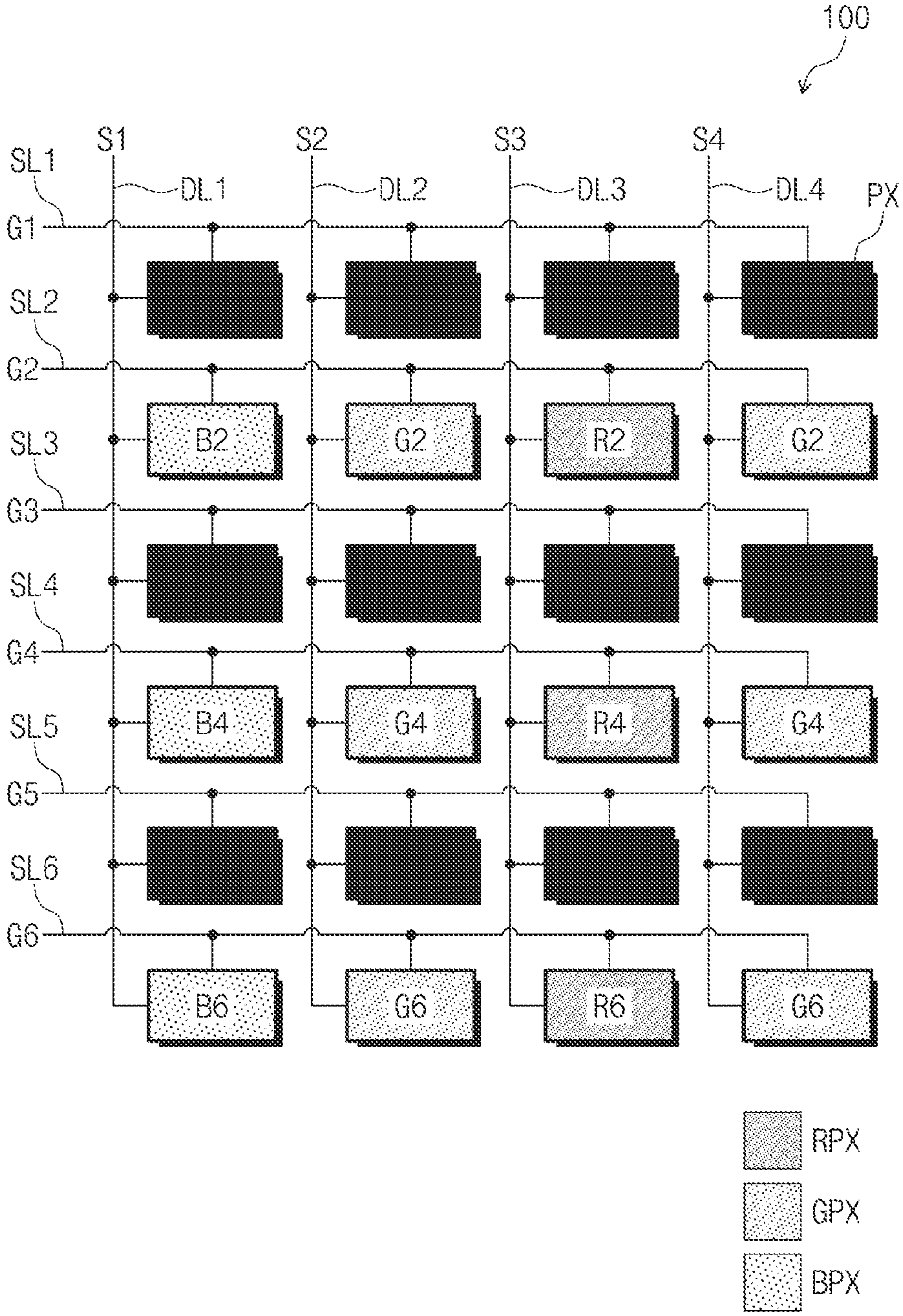
FIG. 8B illustrates an operation of the image processor in a second low-frequency frame of the low frequency mode according to another embodiment of the inventive concept.

FIGS. 7B and 8B illustrate the operation of the image processor 112 in the second low-frequency frame FL2 of the low-frequency mode according to some embodiments of the inventive concept.

Referring to FIGS. 3 and 7B, the mode determination part 210 outputs the second image signal group as the first image signal RGB1 in the second low-frequency frame FL2 of the low frequency mode. The second image signal group may include scan signals S2, S4, S6, . . . , Sn to be provided to the pixels PX that are connected to the even-numbered scan lines SL2, SL4, SL6, . . . , SLn.

Since the image conversion part 220 operates regardless of the operation mode, the image conversion part 220 recognizes that the first image signal RGB1 corresponding to pixels, that is, the third color pixel BPX, the second color pixel GPX, the first color pixel RPX, and the second color pixel GPX, which are connected to the scan line SL2 of the display panel 100, corresponds to an odd-numbered row, that is, a first row, and converts the first image signal RGB1 into a second image signal RGB2 including a first color signal R2, a second color signal G2, a third color signal B2, and a second color signal G2.

Therefore, the first color signal R2, the second color signal G2, the third color signal B2, and the second color signal G2 may be respectively provided to the third color pixel BPX, the second color pixel GPX, the first color pixel RPX, and the second color pixel GPX in the second row.

If the third color signal B4 is provided to the first color pixel RPX in the fourth row, or the first color signal R4 is provided to the third color pixel BPX in the fourth row, the display quality of the display panel 100 may be deteriorated.

The output part 230 illustrated in FIG. 3 may convert the second image signal RGB2 into the image data signal DS based on the swap information SWP stored in the lookup table 240 when the mode signal MD indicates the low frequency mode. The swap information SWP may include information on a color signal that needs to be changed to another color signal among the color signals in the second image signal RGB2.

FIG. 9 is a diagram illustrating the swap information SWP stored in the lookup table 240 according to an embodiment of the inventive concept.

Referring to FIG. 9, the driving frequency of the normal mode is 60 Hz, and the driving frequency of the low frequency mode is one of 30 Hz, 20 Hz, 15 Hz, 10 Hz, and 5 Hz, but these are only examples, and the inventive concept is not limited thereto. The driving frequency of the normal mode and the driving frequency of the low frequency mode may be variously changed without deviating from the scope of the inventive concept.

Also, during the first low-frequency frame FL1 (refer to FIG. 6), the lookup table 240 stores information on color signals provided to a data line (e.g., the data line D1) of the display panel 100 illustrated in FIG. 1. Information on the color signals provided to the other data lines (e.g., the data lines DL2 to DLm) of the first low-frequency frame FL1 and the data lines DL1 to DLm of the second low-frequency frame FL2 may be stored in the lookup table 240 similarly.

Referring to FIGS. 3 and 9, as shown in FIG. 4, while the driving frequency of the normal mode is 60 Hz, a first color signal R1, a third color signal B2, a first color signal R3, a third color signal B4, a first color signal R5, and a third color signal B6 may be sequentially provided to the data line D1 of the display panel 100.

While the driving frequency of the low frequency mode is 30 Hz, the first color signal R1, the first color signal R3, and the first color signal R5 may be sequentially provided to the data line D1 of the display panel 100, as shown in FIG. 8A. However, if the output part 230 does not perform a data swap operation (see FIG. 9), the second image signal RGB2 that is output from the image conversion part 220 may include the first color signal R1, the third color signal B3, and the first color signal R5, as illustrated in FIG. 7A.

The lookup table 240 stores information on color signals that are swapped. In FIG. 9, a shaded cell of the lookup table 240 indicates a color signal that requires data swap. For example, while the driving frequency of the low frequency mode is 30 Hz, the third color signals B3, B7, B11, B15, B19, and B23 are swapped with the first color signals.

The output part 230 may swap the third color signals B3, B7, B11, B15, B19, and B23 of the second image signal RGB2 with the first color signals R3, R7, R11, R15, R19, and R23 (not shown) by referring to the lookup table 240.

Although not shown in the drawing, the output part 230 may swap the first color signals R3, R7, R11, R15, R19, and R23 of the second image signal RGB2 with the third color signals B3, B7, B11, B15, B19, and B23 by referring to the lookup table 240.

According to the operation of the output part 230 as described above, as shown in FIG. 8A, in the first low-frequency frame FL1 of the low frequency mode, a first color signal, a second color signal, a third color signal, and a second color signal may be respectively provided to the first color pixel RPX, the second color pixel GPX, the third color pixel BPX, and the first color pixel RPX of the first row and other odd-numbered rows of the display panel 100.

Also as shown in FIG. 8B, in the second low-frequency frame FL2 of the low frequency mode, a third color signal, a second color signal, a first color signal, and a second color signal may be respectively provided to the third color pixel BPX, the second color pixel GPX, the first color pixel RPX, and the second color pixel GPX of the second row and other even-numbered rows of the display panel 100.

As shown in FIG. 9, when the driving frequency of the normal mode is 60 Hz, and the driving frequency of the low frequency mode is 20 Hz, a swap operation may not be performed.

Even if the mode signal MD may indicate the low frequency mode, the output part 230 may selectively perform a swap operation according to a relationship between the driving frequency of the normal mode and the driving frequency of the low frequency mode.

Figure 10:
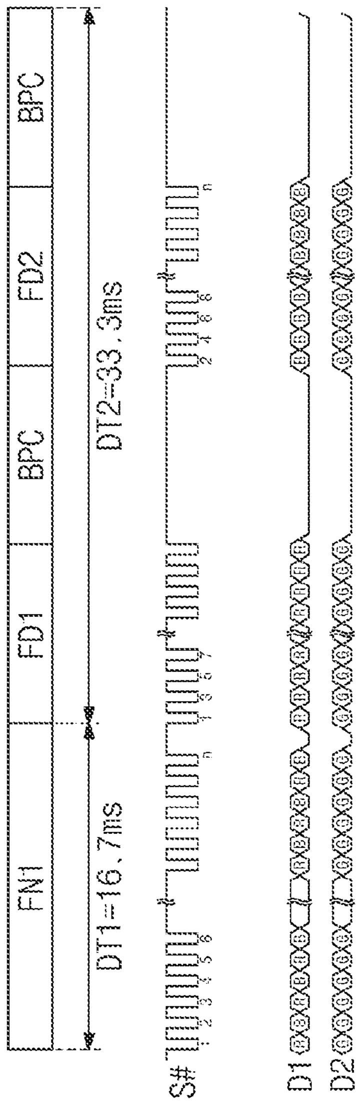
FIG. 10 shows data signals provided to data lines when the driving frequency of the normal mode is 60 Hz and the driving frequency of the low frequency mode is 30 Hz according to an embodiment of the inventive concept.

FIG. 10 shows data signals D1 and D2 provided to data lines when the driving frequency of the normal mode is 60 Hz and the driving frequency of the low frequency mode is 30 Hz according to an embodiment of the inventive concept.

Figure 11:
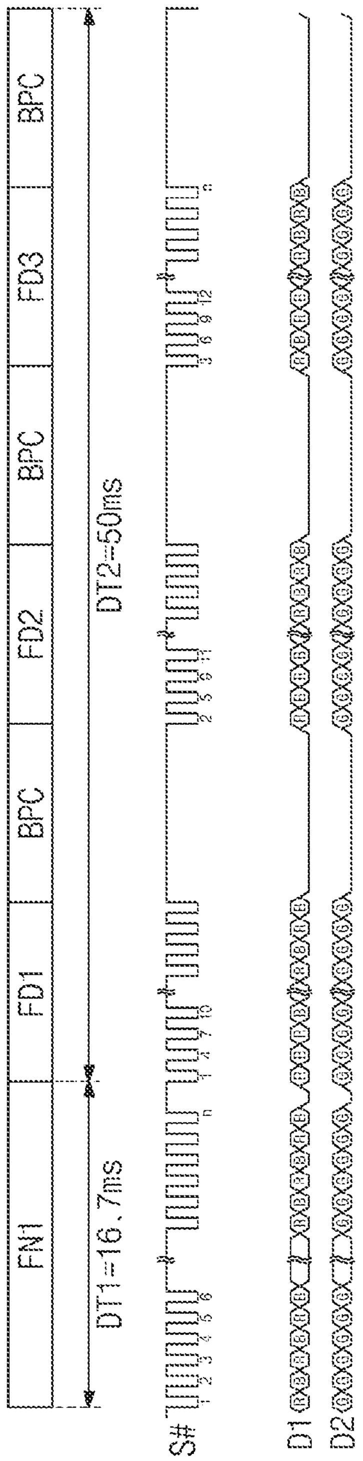
FIG. 11 shows data signals provided to data lines when the driving frequency of the normal mode is 60 Hz and the driving frequency of the low frequency mode is 20 Hz according to an embodiment of the inventive concept.

FIG. 11 shows data signals D1 and D2 provided to data lines when the driving frequency of the normal mode is 60 Hz and the driving frequency of the low frequency mode is 20 Hz according to an embodiment of the inventive concept.

Figure 12:
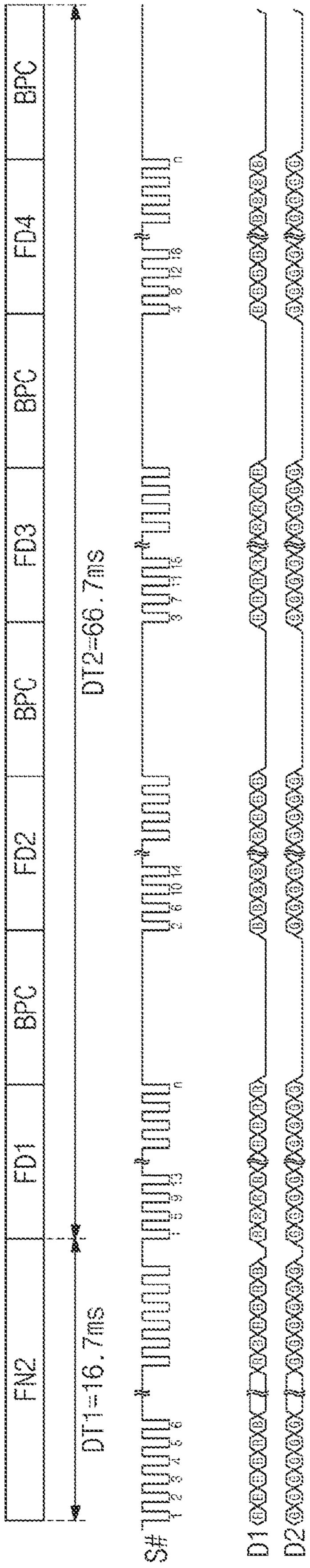
FIG. 12 shows data signals provided to data lines when the driving frequency of the normal mode is 60 Hz and the driving frequency of the low frequency mode is 15 Hz according to an embodiment of the inventive concept.

FIG. 12 shows data signals D1 and D2 provided to data lines when the driving frequency of the normal mode is 60 Hz and the driving frequency of the low frequency mode is 15 Hz according to an embodiment of the inventive concept.

In FIGS. 10 to 12, the scan signals S1 to Sn are shown in a waveform, and the number of the scan signal is indicated as a number at a time point when each of the scan signals S1 to Sn transitions to an active level (e.g., a low level).

First, referring to FIGS. 6 and 10, when the driving frequency of the normal mode is 60 Hz, the driving time DT1 of the first normal frame FN1 that corresponds to a period of each of the scan signals S1 to Sn is 16.7 ms. When the driving frequency of the low frequency mode is 30 Hz, the driving time DT2 of the first and second low-frequency frames FL1 and FL2 that corresponds to a period DT2 of each of the scan signals S1 to Sn is 33.3 ms.

During the low frequency mode, the first low-frequency frame FL1 that includes the first low-frequency driving section FD1, the blank section BPC, and the second low-frequency frame FL2 that includes the second low-frequency driving section FD2, and the blank section BPC are repeated.

During the low frequency mode, the data signals D1 and D2 may be provided to the data lines DL1 and DL2 (refer to FIG. 1) during the first low-frequency driving section FD1 and the second low-frequency driving section FD2.

Referring to FIG. 11, when the driving frequency of the low frequency mode is 20 Hz, the period or the driving time DT2 of each of the scan signals S1 to Sn is 50 ms.

During the low frequency mode, the first low-frequency driving section FD1, the blank section BPC, the second low-frequency driving section FD2, the blank section BPC, the third low-frequency driving section FD3, and the blank section BPC are repeated.

During the low frequency mode, the data signals D1 and D2 may be provided to the data lines DL1 and DL2 (refer to FIG. 1) during the first low-frequency driving section FD1, the second low-frequency driving section FD2, and the third low-frequency driving section FD3.

Referring to FIG. 12, when the driving frequency of the low frequency mode is 15 Hz, the period or the driving time DT2 of each of the scan signals S1 to Sn is 66.7 ms.

During the low frequency mode, the first low-frequency driving section FD1, the blank section BPC, the second low-frequency driving section FD2, the blank section BPC, the third low-frequency driving section FD3, the blank section BPC, the fourth low-frequency driving section FD4, and the blank section BPC are repeated.

During the low frequency mode, the data signals D1 and D2 may be provided to the data lines DL1 and DL2 (refer to FIG. 1) during the first low-frequency driving section FD1, the second low-frequency driving section FD2, the third low-frequency driving section FD3, and the fourth low-frequency driving section FD4.

Figure 13:
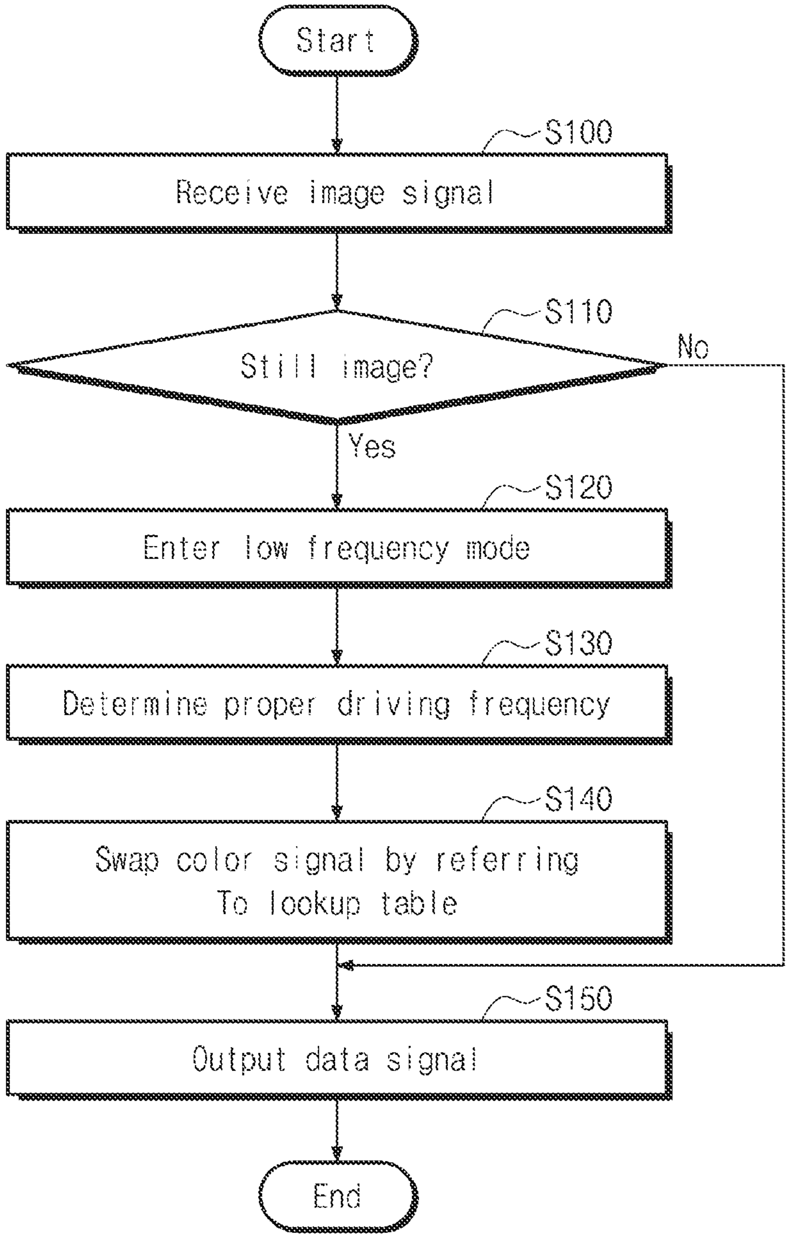
FIG. 13 is a flowchart for driving a display device according to an embodiment of the inventive concept.

FIG. 13 is a flowchart for driving a display device according to an embodiment of the inventive concept.

For convenience of explanation, the description will be made with reference to the image processor 112 illustrated in FIG. 3.

Referring to FIGS. 3 and 13, the mode determination part 210 receives an image signal RGB (operation S100).

The mode determination part 210 determines whether the image signal RGB is a still image signal (step S110).

If the image signal RGB is a still image signal, the mode determination part 210 sets the operation mode of the image processor 112 to a low frequency mode (operation S120).

The mode determination part 210 determines an appropriate driving frequency of the low frequency mode based on the type of the image signal RGB, the type of the display device DD, the type of an application program, and the like (operation S130).

The mode determination part 210 may output a first image signal RGB1 corresponding to the operation mode. The image conversion part 220 converts the first image signal RGB1 into a second image signal RGB2. The second image signal RGB may include a first color signal, a second color signal, and a third color signal.

The output part 230 may refer to the look-up table 240 in response to the mode signal MD and selectively and/or conditionally swap one or more of the first color signal, the second color signal, and the third color signal of the second image signal RGB2 with another color signal (operation S140).

The output part 230 outputs the image data signal DS to the data driving circuit 120 (refer to FIG. 1) based on the swap operation of the color signal(s) (operation S150).

If the image signal RGB is not a still image signal, for example, a video image signal, the control may proceed to the operation S150. When the image signal RGB is a video image signal, the mode signal MD may indicate a normal mode, and the output part 230 may output the second image signal RGB2 as the image data signal DS without a swap operation of the color signal(s).

Figure 14:
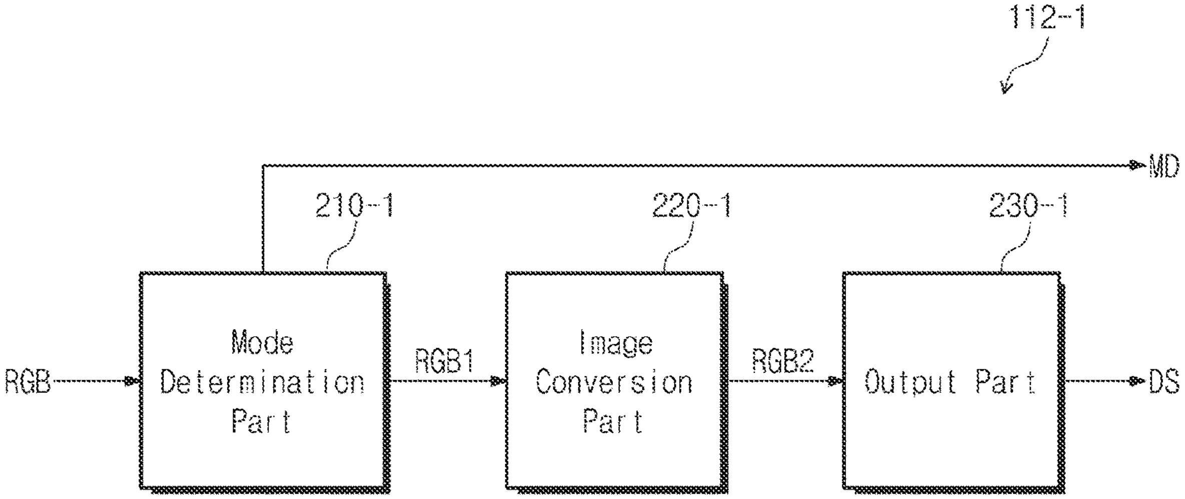
FIG. 14 is a block diagram of an image processor according to another embodiment of the inventive concept.

FIG. 14 is a block diagram of an image processor according to another embodiment of the inventive concept.

Referring to FIG. 14, an image processor 112-1 includes a mode determination part 210-1, an image conversion part 220-1, and an output part 230-1.

The mode determination part 210-1 and the image conversion part 220-1 shown in FIG. 14 operate similarly to the mode determination part 210 and the image conversion part 220 shown in FIG. 3, and thus descriptions thereof are omitted.

In an embodiment, the mode signal MD that is output from the mode determination part 210-1 may be included in the first control signal DCS and provided to the data driving circuit 120. In an embodiment, the mode signal MD that is output from the mode determination part 210-1 may be provided to the data driving circuit 120 through a separate signal line.

The output part 230-1 may convert the second image signal RGB2 received from the image conversion part 220-1 into the image data signal DS.

The output part 230 shown in FIG. 3 may output the image data signal DS by swapping one or more of the color signals of the second image signal RGB2 in response to the mode signal MD, but the output part 230-1 shown in FIG. 14 may not perform such a swap operation.

Figure 15:
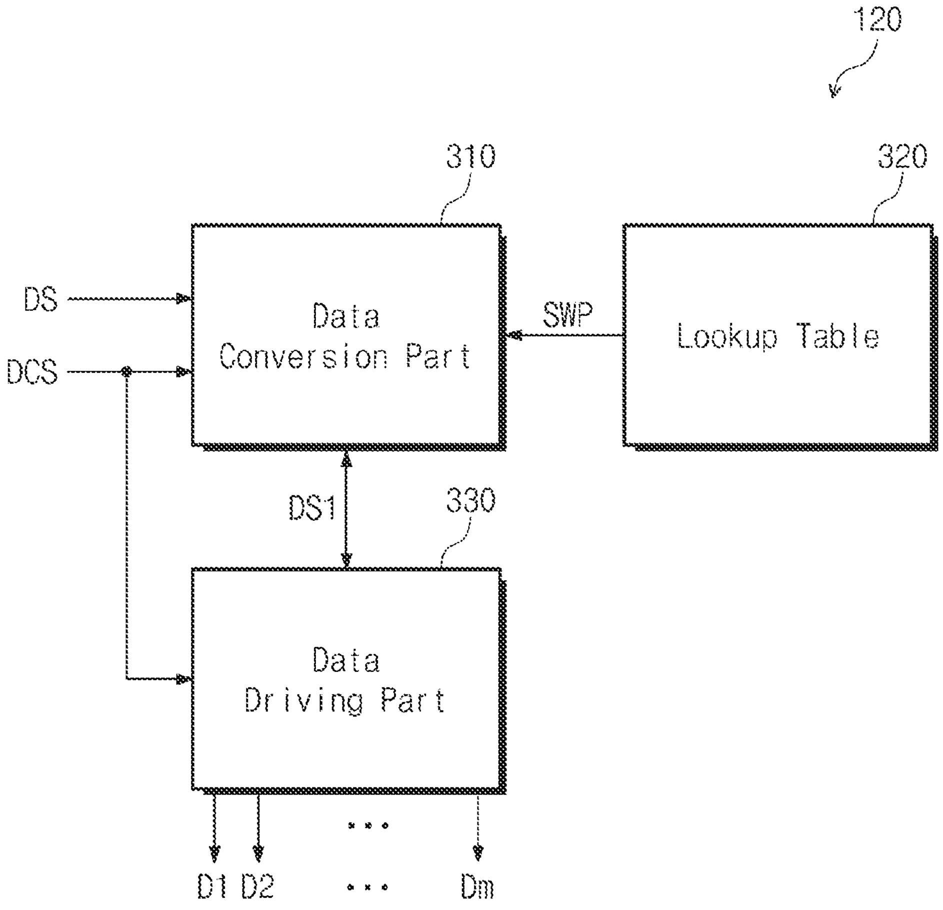
FIG. 15 is a block diagram of a data driving circuit according to an embodiment of the inventive concept.

FIG. 15 is a block diagram of the data driving circuit 120 shown in FIG. 1 according to an embodiment of the inventive concept.

Referring to FIG. 15, the data driving circuit 120 includes a data conversion part 310, a lookup table 320, and a data driving part 330.

The data conversion part 310 may receive the image data signal DS and the first control signal DCS from the image processor 112-1 illustrated in FIG. 14. The first control signal DCS may include the mode signal MD that is output from the mode determination part 210-1.

The data conversion part 310 may convert the image data signal DS into a first image data signal DS1 in response to the mode signal MD that is included in the first control signal DCS. The data conversion part 310 may convert the image data signal DS into the first image data signal DS1 based on the swap information SWP stored in the lookup table 320.

The lookup table 320 may store the swap information SWP of a color signal in a manner similar to the lookup table 240 illustrated in FIGS. 3 and 9.

The data driving part 330 may convert the first image data signal DS1 into the data signals D1 to Dm. The data signals D1 to Dm may be provided to the data lines DL1 to DLm as shown in FIG. 1.

In an embodiment, the data conversion part 310 may convert the image data signal DS to the first image data signal DS1 based on the swap information SWP from the lookup table 320 when the mode signal MD indicates a low frequency mode. The swap information SWP may include information on a color signal that needs to be changed to another color signal among the color signals in the image data signal DS.

Therefore, in the low frequency mode, the data driving circuit 120 may output data signals D1 to Dm that are suitable for an arrangement order of the first color pixel RPX, the second color pixel GPX, and the third color pixel BPX that are arranged in the display panel 100.

The display device DD may reduce power consumption by alternately driving some of the scan lines SL1 to SLn in each frame. In particular, by converting the data signal to suit the arrangement characteristic of the pixels PX provided in the display panel 100, the present display device DD may prevent the display quality from deteriorating.

Although some embodiments of the inventive concept have been described herein, it is understood that the inventive concept should not be limited to these embodiments, and various changes and modifications may be made by one ordinary skilled in the art within the spirit and scope of the inventive concept as hereinafter claimed.

What is claimed is:

1. A display device comprising:

a display panel including a plurality of pixels respectively connected to at least one of a plurality of data lines and at least one of a plurality of scan lines;

a data driving circuit configured to drive the plurality of data lines;

a scan driving circuit configured to drive the plurality of scan lines; and a driving controller configured to receive an image signal and a control signal, determine an operation mode based on the image signal, generate an image data signal based on the image signal, and provide the image data signal to the data driving circuit, wherein the plurality of pixels comprise a plurality of color pixels comprising four color pixels repeatedly arranged in a first direction, wherein the plurality of color pixels in a first row are repeatedly arranged in a first arrangement order of the four color pixels, the first arrangement order being a first color pixel configured to emit a first color, a second color pixel configured to emit a second color, a third color pixel configured to emit a third color, and the second color pixel, wherein the plurality of color pixels in a second row adjacent to the first row are repeatedly arranged in a second arrangement order of the four color pixels, the second arrangement order being the third color pixel, the second color pixel, the first color pixel, and the second color pixel, and wherein the driving controller is further configured to:

control the scan driving circuit based on the operation mode being a low frequency mode to sequentially drive a first group of scan lines among the plurality of scan lines to an active level during a first low-frequency frame, and sequentially drive a second group of scan lines among the plurality of scan lines to the active level during a second low-frequency frame; and output the image data signal according to the first arrangement order of the plurality of color pixels in the first row during the first low-frequency frame, and output the image data signal according to the second arrangement order of the plurality of color pixels in the second row during the second low-frequency frame, wherein scan lines of the first group and scan lines of the second group are alternately arranged one by one, wherein the driving controller comprises:

an image processor configured to receive the image signal and the control signal, and output a mode signal and the image data signal, the mode signal indicating whether the operation mode is the low frequency mode or a normal mode.

2. The display device of claim 1, wherein the image data signal provided to the four color pixels in the first row during the first low-frequency frame comprises a first color signal corresponding to the first color pixel, a second color signal corresponding to the second color pixel, a third color signal corresponding to a third color pixel, and the second color signal corresponding to the second color pixel.

3. The display device of claim 1, wherein the image data signal provided to the four pixels in the second row during the second low-frequency frame comprises a third color signal corresponding to the third color pixel, a second color signal corresponding to the second color pixel, a first color signal corresponding to the first color pixel, and the second color signal corresponding to the second color pixel.

4. The display device of claim 1, wherein the driving controller comprises:

a control signal generation part configured to receive the image signal and the control signal and output a first control signal and a second control signal in response to the mode signal, wherein the data driving circuit receives the first control signal, and the scan driving circuit receives the second control signal.

5. The display device of claim 4, wherein the image processor comprises:

a mode determination part configured to output the mode signal and a first image signal based on the image signal;

an image conversion part configured to convert the first image signal into a second image signal; and an output part configured to convert the second image signal into the image data signal and output the image data signal in response to the mode signal.

6. The display device of claim 5, wherein the first image signal comprises a first color signal, a second color signal, and a third color signal, wherein the second image signal corresponding to the first row comprises the first color signal, the second color signal, the third color signal, and the second color signal, and wherein the second image signal corresponding to the second row comprises the third color signal, the second color signal, the first color signal, and the second color signal.

7. The display device of claim 6, further comprising a lookup table for storing swap information for the first color signal, the second color signal, and the third color signal in the second image signal, wherein the output part converts the second image signal into the image data signal based on the swap information in the low frequency mode.

8. The display device of claim 7, wherein the lookup table stores the swap information for the first color signal, the second color signal, and the third color signal in the second image signal corresponding to a plurality of driving frequencies of the low frequency mode.

9. The display device of claim 1, wherein the driving controller determines that the operation mode is the low frequency mode based on the image signal being a still image signal.

10. The display device of claim 9, wherein the driving controller determines that the operation mode is the normal mode based on the image signal being a video image signal.

11. The display device of claim 10, wherein the driving controller controls the scan driving circuit to sequentially drive the plurality of scan lines to an active level in each frame in the normal mode.

12. The display device of claim 10, wherein a driving frequency of the low frequency mode is lower than a driving frequency of the normal mode.

13. A display device comprising:

a display panel including a plurality of pixels respectively connected to at least one of a plurality of data lines and at least one of a plurality of scan lines;

a data driving circuit configured to drive the plurality of data lines;

a scan driving circuit configured to drive the plurality of scan lines; and a driving controller configured to receive an image signal and a control signal, generate an image data signal based on the image signal, and output a mode signal corresponding to the image signal and the image data signal, the mode signal indicating whether an operation mode is a low frequency mode or a normal mode, wherein the plurality of pixels comprise a plurality of color pixels comprising four color pixels repeatedly arranged in a first direction, wherein the plurality of color pixels in a first row are repeatedly arranged in a first arrangement order of the four color pixels, the first arrangement order being a first color pixel configured to emit a first color, a second color pixel configured to emit a second color, a third color pixel configured to emit a third color, and the second color pixel, wherein the plurality of color pixels in a second row adjacent to the first row are repeatedly arranged in a second arrangement order of the four color pixels, the second arrangement order being the third color pixel, the second color pixel, the first color pixel, and the second color pixel, wherein the driving controller controls the scan driving circuit based on the mode signal indicating the low frequency mode to sequentially drive a first group of scan lines among the plurality of scan lines to an active level during a first low-frequency frame and sequentially drive a second group of scan lines among the plurality of scan lines to the active level during a second low-frequency frame, and wherein the data driving circuit outputs a data signal according to the first arrangement order of the plurality of color pixels in the first row to the plurality of data lines during the first low-frequency frame, and outputs the data signal according to the second arrangement order of the plurality of color pixels in the second row to the plurality of data lines during the second low-frequency frame, wherein scan lines of the first group and scan lines of the second group are alternately arranged one by one.

14. The display device of claim 13, wherein the data signal provided to the four color pixels in the first row during the first low-frequency frame comprises a first color signal corresponding to the first color pixel, a second color signal corresponding to the second color pixel, a third color signal corresponding to a third color pixel, and the second color signal corresponding to the second color pixel.

15. The display device of claim 13, wherein the data signal provided to the four pixels in the second row during the second low-frequency frame comprises a third color signal corresponding to the third color pixel, a second color signal corresponding to the second color pixel, a first color signal corresponding to the first color pixel, and the second color signal corresponding to the second color pixel.

16. The display device of claim 13, wherein the data driving circuit comprises:

a lookup table configured to store swap information for color signals of the image data signal;

a data conversion part configured to convert the image data signal into a first image data signal based on the image data signal and the swap information; and a data driving part configured to receive the first image data signal and provide a plurality of data signals to the plurality of data lines.

17. The display device of claim 1 wherein the first color is a red color, the second color is a green color, and the third color is a blue color.

18. The display device of claim 13 wherein the first color is a red color, the second color is a green color, and the third color is a blue color.

* * * * *